(12) United States Patent
Amano (10) Patent No.: US 7,773,309 B2
(45) Date of Patent: Aug. 10, 2010

(54) PROJECTION ZOOM LENS DEVICE AND PROJECTION-TYPE DISPLAY APPARATUS

(75) Inventor: Masaru Amano, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 242 days.

(21) Appl. No.: 12/134,745

(22) Filed: Jun. 6, 2008

(65) Prior Publication Data

US 2009/0015934 A1    Jan. 15, 2009

(30) Foreign Application Priority Data

Jul. 11, 2007    (JP)    ............................ P2007-182330

(51) Int. Cl.
*G02B 15/14* (2006.01)
*G02B 3/00* (2006.01)
*G02B 9/60* (2006.01)

(52) U.S. Cl. .................. 359/683; 359/649; 359/676; 359/770

(58) Field of Classification Search ................. 359/649, 359/676, 683, 685, 770
See application file for complete search history.

(56) References Cited

U.S. PATENT DOCUMENTS

2006/0061872 A1    3/2006    Yamasaki

FOREIGN PATENT DOCUMENTS

| CN | 1749799 | 3/2006 |
|---|---|---|
| JP | 2000-137165 A | 5/2000 |
| JP | 2001-91829 A | 4/2001 |

OTHER PUBLICATIONS

State Intellectual Property Office Action of People's Republic of China, Sep. 25, 2009.

*Primary Examiner*—Jack Dinh
(74) *Attorney, Agent, or Firm*—Birch, Stewart, Kolasch & Birch, LLP

(57) ABSTRACT

A projection zoom lens device includes, in order from a magnification side, a negative first group G1 and positive second to fifth groups ($G_2$ to $G_5$) and is configured so that the second group $G_2$, the third group $G_3$, and the fourth group $G_4$ are moved along an optical axis toward the magnification side during zooming from a wide-angle end state to a telephoto end state. Also, a lens $L_4$, being closest to the magnification side, of the second group $G_2$ is formed of a negative lens, and the fifth group $G_5$ includes a single positive lens.

6 Claims, 9 Drawing Sheets

EXAMPLE 1

← MAGNIFICATION SIDE    REDUCTION SIDE →

FIG. 1

EXAMPLE 1

FIG. 2

EXAMPLE 2

FIG. 3

EXAMPLE 3

FIG. 4

EXAMPLE 4

FIG. 5

EXAMPLE 1

FIG. 6

EXAMPLE 2

FIG. 7

EXAMPLE 3

FIG. 8

EXAMPLE 4

FIG. 9

PROJECTION ZOOM LENS DEVICE AND PROJECTION-TYPE DISPLAY APPARATUS

CROSS-REFERENCE TO RELATED APPLICATIONS

This application is based upon and claims the benefit of priority from the Japanese Patent Application No. 2007-182330 filed on Jul. 11, 2007; the entire contents of which are incorporated herein by reference.

BACKGROUND OF THE INVENTION

1. Technical Field

The invention relates to a projection zoom lens device having a five-group configuration and being mounted on a projection-type display apparatus and to a projection-type display apparatus having the projection zoom lens device, and particularly, to a projection zoom lens device configured so that a light flux containing image information, which is generated from a light valve such as a liquid crystal display device or a DMD (Digital Micromirror Device) display device, is magnified and projected onto a screen, and a projection-type display apparatus.

2. Description of Related Art

Recently, a projection-type display apparatus using a light valve such as a liquid crystal display device or a DMD display device has come into widespread use. In particular, the most widely used is a projection-type display apparatus having the configuration that respective illumination light are modulated by using three light valves so that these light valves correspond to the illumination light of ROB three primary colors, the light modulated by the respective light valves are synthesized by a prism or the like, and an image is displayed onto a screen through a projection lens device.

A decrease in size and an increase in accuracy are rapidly progressing in the light valve. Besides, with an increase in spread of PCs, the demands of performing presentation using such a projection-type display apparatus increases. Hence, a demand for a more high-performance and more small-sized lightweight projection-type display apparatus arises.

Specifically, in a projection-type display apparatus that synthesizes and projects the modulated light from the three light valves by using the color synthesizing optical system, there is required a long back focal length in order to arranging a prism and the like which synthesize colors, because of a characteristic of a projection lens. In addition, in a color synthesizing optical system, spectrum characteristic thereof is changed depending on an angle of incident light. Thus, the projection lens is required to have telecentricity, which is defined as a characteristic of a telemetric system in which an entrance pupil is at infinity when viewed from a reduction side. Also, there is required aberration correction appropriate to resolution of the device, and there is also required a zoom function in view of installation convenience.

JP 2000-137165 A and JP 2001-91829 A disclose projection lens devices satisfying the conditions mentioned above. The lens devices have a five-group configuration of negative, positive, positive, positive (or negative) and positive refractive power in order from a magnification side. In the lens devices, during zooming, the second lens group, the third lens group, and the fourth lens group are moved in an optical axis direction while the first lens group and the fifth lens group are fixed.

However, with regard to the projection zoom lens device described in JP 2000-137165 A and JP 2001-91829 A, further improvement in longitudinal chromatic aberration is demanded.

In particular, when the projection zoom lens device is used in a projection-type display apparatus in which the entire projection zoom lens device is replaceable, even in terms of longitudinal chromatic aberration, it is required to sufficiently correct aberrations solely by the projection zoom lens device. Therefore, in this point of view, the projection zoom lens devices described in JP 2000-137165 A and JP 2001-91829 A have room for improvement.

SUMMARY OF THE INVENTION

The invention has been made in view of the above circumstances and provides a projection zoom lens device that has a five-group configuration and can maintain telecentricity on a reduction side, secure a sufficient back focus, and satisfactorily correct various aberrations, particularly, longitudinal chromatic aberration, and a projection-type display apparatus having the projection zoom lens device.

According to an aspect of the invention, a projection zoom lens device includes, in order from a magnification side, first to fifth lens groups. The first lens group has a negative refractive power and is fixed during zooming. The second lens group has a positive refractive power. The third lens group has a positive refractive power. The fourth lens group has a positive refractive power or a negative refractive power. The second to fourth lens groups are moved, independently from each other, along an optical axis during zooming. The fifth lens group has a positive refractive power and is fixed during zooming. A lens, being closest to the magnification side, of the second lens group is formed of a negative lens. The fifth lens group is formed of a single positive lens.

Also, it is preferable that the following conditional expressions (1) to (3) are satisfied:

$$0.3 < |f1a/fw| < 1.6 \quad (1)$$

$$1.5 < f5/fw < 3.0 \quad (2)$$

$$0.8 < Bf/fw \quad (3)$$

where f1a denotes a synthetic focal length of the first lens group and the lens of the second lens group being closest to the magnification side, in a wide-angle end state, fw denotes a focal length of the projection zoom lens device in the wide-angle end state, f5 denotes a focal length of the fifth lens group, and Bf denotes an air-equivalent value of a back focal length with a conjugate point of the magnification side being at infinity.

Also, it is preferable that the second lens group, the third lens group, and the fourth lens group are moved in the same direction during zooming.

Also, it is preferable that the fourth lens group satisfies the following conditional expression (4):

$$3.0 < |f4/fw| \quad (4)$$

where f4 denotes a focal length of the fourth lens group.

Also, it is preferable that the negative lens is disposed to be closest to the magnification side of the second lens group, and is cemented to a positive lens located on a reduction side of the negative lens.

According to another aspect of the invention, a projection-type display apparatus includes a light source, a light valve, an illumination optical section that guides a light flux emitted from the light source, to the light valve, and any of the projection zoom lens device set forth above. The light flux emitted from the light source is optically modulated by the light valve, and is projected onto a screen by the projection zoom lens device.

The projection zoom lens device set forth above has a five-lens group configuration, and the lens of the second lens group that is closest to the magnification side and is adjacent to the first lens group is formed of the negative lens. Thus, it is possible to distribute the negative refractive power concentrating around the magnification side to much more lenses. Therefore, it is possible to achieve improvement in longitudinal chromatic aberration which was a problem in the conventional art.

Also, it is possible to satisfactorily correct various aberrations including longitudinal chromatic aberration solely by the projection zoom lens device. Therefore, it is more advantageous for a projection-type display apparatus in which the whole projection zoom lens device is replaceable.

DETAILED DESCRIPTION OF EMBODIMENTS OF THE INVENTION

Hereinafter, embodiments of the invention will be described in detail with reference to the drawings. A projection zoom lens device of an embodiment shown in FIG. 1 (which shows a wide-angle end state of one according to Example 1 as a representative configuration) includes, in order from a magnification side, a first lens group $G_1$ having a negative refractive power, a second lens group $G_2$ having a positive refractive power, a third lens group $G_3$ having a positive refractive power, a fourth lens group $G_4$ having a negative refractive power, and a fifth lens group $G_5$ having a positive refractive power. Also, in the subsequent stage thereof, there are also arranged a glass block 2 (which includes a filter portion) mainly formed of a color synthesizing prism and an image display surface 1 of a light valve such as a liquid crystal display panel. In addition, a reference sign X in the drawing represents an optical axis.

Figure 1:
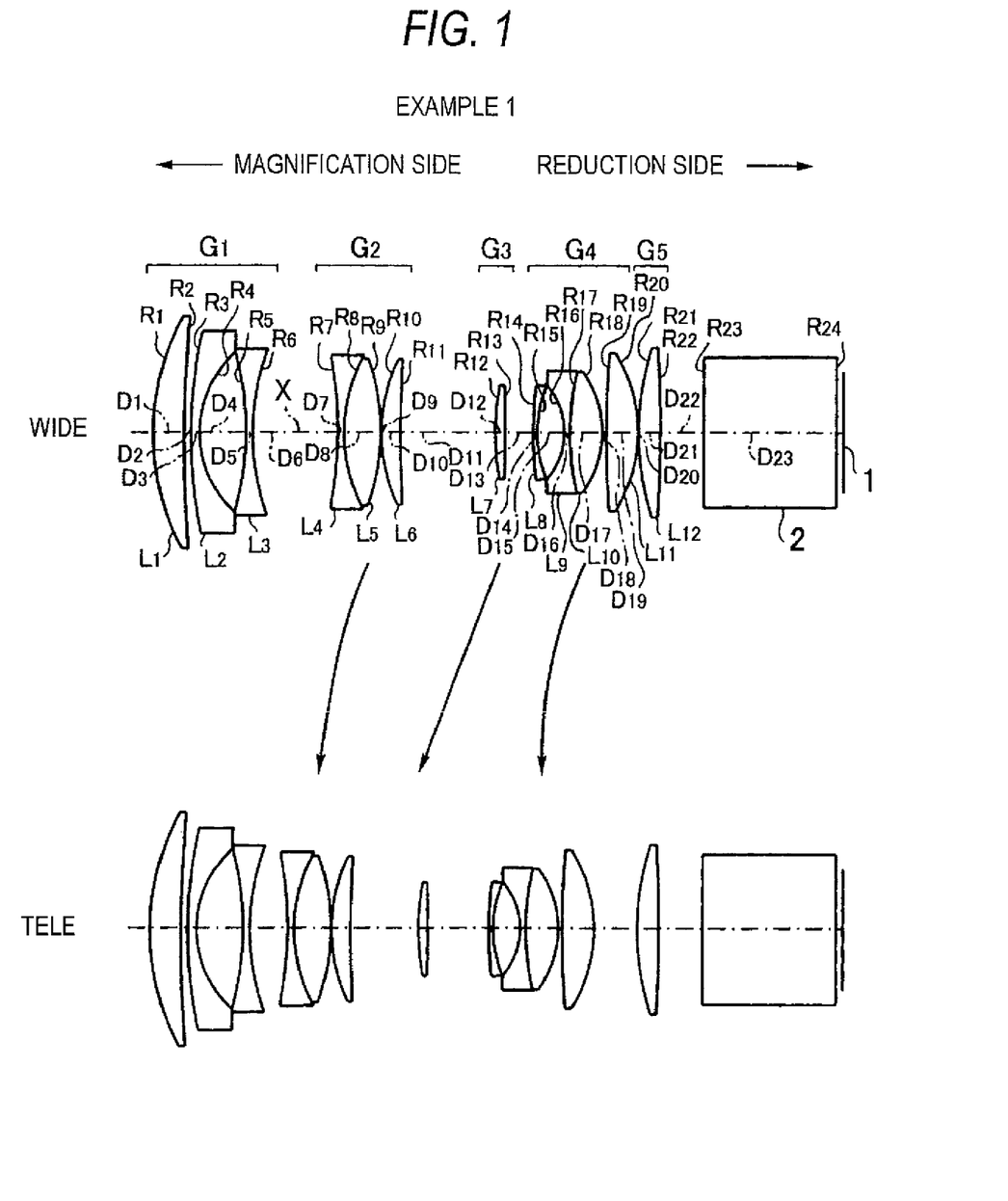
FIG. 1 is a schematic diagram showing the configuration of a projection zoom lens device according to Example 1 of the invention.

In this case, the first lens group $G_1$ includes, in order from the magnification side, a first lens $L_1$ formed of a positive lens, a second lens $L_2$ formed of a negative meniscus lens having a convex surface directed toward the magnification side, and a third lens $L_3$ formed of a biconcave lens. Also, the second lens group $G_2$ includes, in order from the magnification side, a cemented lens formed by cementing a fourth lens $L_4$ formed of a negative lens having a concave surface directed toward the reduction side and a fifth lens $L_5$ formed of a positive lens having a convex surface directed toward the magnification side, and a sixth lens $L_6$ formed of a positive lens. Also, the third lens group $G_3$ includes a seventh lens $L_7$ formed of one positive lens. Also, the fourth lens group $G_4$ includes, in order from the magnification side, an eighth lens $L_8$ formed of a negative lens, a cemented lens formed by cementing a ninth lens $L_9$ formed of a negative lens having a concave surface directed toward the reduction side and a tenth lens $L_{10}$ formed of a positive lens having a convex surface directed toward the magnification side, and an eleventh lens $L_{11}$ formed of a positive lens. Also, the fifth lens group $G_5$ includes only a twelfth lens $L_{12}$ formed of a positive lens.

In addition, the lens configurations of the lens groups are not limited to the configuration mentioned above. One or more negative lens or positive lens may be added thereto or removed therefrom.

Also, the fourth lens group $G_4$ may be configured to have a positive refractive power.

As described above, the projection zoom lens device according to this embodiment is configured to be a negative lead type zoom lens. Hence, it is easy to achieve an increase in angle of view, and it is possible to secure an appropriate back focal length.

Also, the projection zoom lens device according to this embodiment is configured to be able to perform a zoom function by moving three lens groups of the second lens group $G_2$ to fourth lens group $G_4$ in the same direction during zooming. During zooming from the wide-angle end state to the telephoto end state, all these three movable lens groups are configured to be moved toward the magnification side. Thus, it is possible to achieve compact design and set a large zooming ratio.

However, this means that positions of the respective three lens groups in the telephoto end state are closer to the magnification side than positions of the lens groups in the wide-angle end state, but does not exclude the case where any of the lens groups is temporally moved toward the reduction side in the intermediate region.

Also, according to the projection zoom lens device of this embodiment, the whole lens system is divided into the five groups, and a zooming function is distributed to the respective groups by independently moving the respective three lens groups during zooming. Therefore, it is possible to improve optical performance and suppress change of F number during zooming.

Also, the lens of the second lens group $G_2$ that is closest to the magnification side and is adjacent to the first lens group $G_1$ is formed of the negative lens. Thus, it is possible to distribute the negative refractive power concentrating around the magnification-side part to much more lenses. Therefore, it is possible to achieve improvement in longitudinal chromatic aberration.

Also, in this embodiment, two lenses being located on the magnification side of the second lens group $G_2$ may be formed of a cemented lens (Examples 1 to 3), or may be separated from each other (Example 4). When these two lenses are cemented to each other, it is more advantageous to correct chromatic aberration.

Generally, a ray height takes a peak in the vicinity of the position of the second lens group $G_2$. Therefore, it is possible to satisfactorily correct chromatic aberration, and it is also possible to decrease zoom movement by a positive refractive power of the positive lens, which is cemented to the negative lens of the second lens group $G_2$. Accordingly, it is preferable that the two lenses be formed of a cemented lens.

Also, it is preferable that the projection zoom lens device according to this embodiment be configured to satisfy the following conditional expressions (1) to (4).

$$0.3 < |f1a/fw| < 1.6 \tag{1}$$

$$1.5 < f5/fw < 3.0 \tag{2}$$

$$0.8 < Bf/fw \tag{3}$$

$$3.0 < |f4/fw| \tag{4}$$

where f1a denotes a synthetic focal length of the first lens group $G_1$ and the lens of the second lens group $G_2$ being closest to the magnification side, in the wide-angle end state, fw denotes a focal length of the projection zoom lens device in the wide-angle end state, f5 denotes a focal length of the fifth lens group $G_5$, Bf denotes an air-equivalent value of a back focal length with a conjugate point of the magnification side being at infinity, and f4 denotes a focal length of the fourth lens group $G_4$.

Now, the technical significance of the conditional expressions (1) to (4) will be described.

First, the conditional expression (1) defines an allowable range of the absolute value obtained by normalizing the synthetic focal length f1a from the first lens group $G_1$ to the lens of the second lens group $G_2$ being closest to the magnification side in the wide-angle end state, by the focal length fw of the projection zoom lens device in the wide-angle end state. This conditional expression also defines an allowable range of a negative power in the magnification-side part of the lens device.

Specifically, if |f1a/fw| exceeds the upper limit of the conditional expression (1), it is difficult to secure a back focus that is sufficient for the projection lens. Conversely, if |f1a/fw| falls below the lower limit thereof, it is difficult to balance various aberrations and particularly to make longitudinal chromatic aberration better.

Accordingly, when the conditional expression (1) is satisfied and the lens of the second lens group $G_2$ closest to the magnification side is formed of the negative lens, it is possible to balance aberrations and simultaneously achieve great improvement in longitudinal chromatic aberration, and it is also possible to secure a sufficient back focus.

Also, from the viewpoint of this purpose, it is more preferable that, instead of the conditional expression (1), the following conditional expression (1') be satisfied:

$$0.6 < |f1a/fw| < 1.6 \tag{1'}$$

Next, the conditional expression (2) defines an allowable range for maintaining telecentricity on the reduction side of the lens device. If f5/fw exceeds the upper limit of the conditional expression (2) or falls below the lower limit of the conditional expression (2) is exceeded, it is difficult to maintain telecentricity on the reduction side of the lens device.

Also, the conditional expression (3) defines an allowable range for appropriately securing the back focus on the reduction side of the lens system. If Bf/fw falls below the lower limit of the conditional expression (3), it is difficult to secure a space, in which the color synthesizing prism or the like is disposed, in the projection-type display apparatus.

Also, the conditional expression (4) defines an allowable range for balancing various aberrations and for making better, particularly, lateral chromatic aberration and a field of curvature. If |f4/fw| falls below the lower limit of the conditional expression (4), a power of the fourth lens group $G_4$ becomes too strong, and powers of the other lens groups having a sign opposite thereto also become too strong accordingly. As a result, it is difficult to make better correction balance between lateral chromatic aberration and field of curvature/astigmatism.

Figure 9:
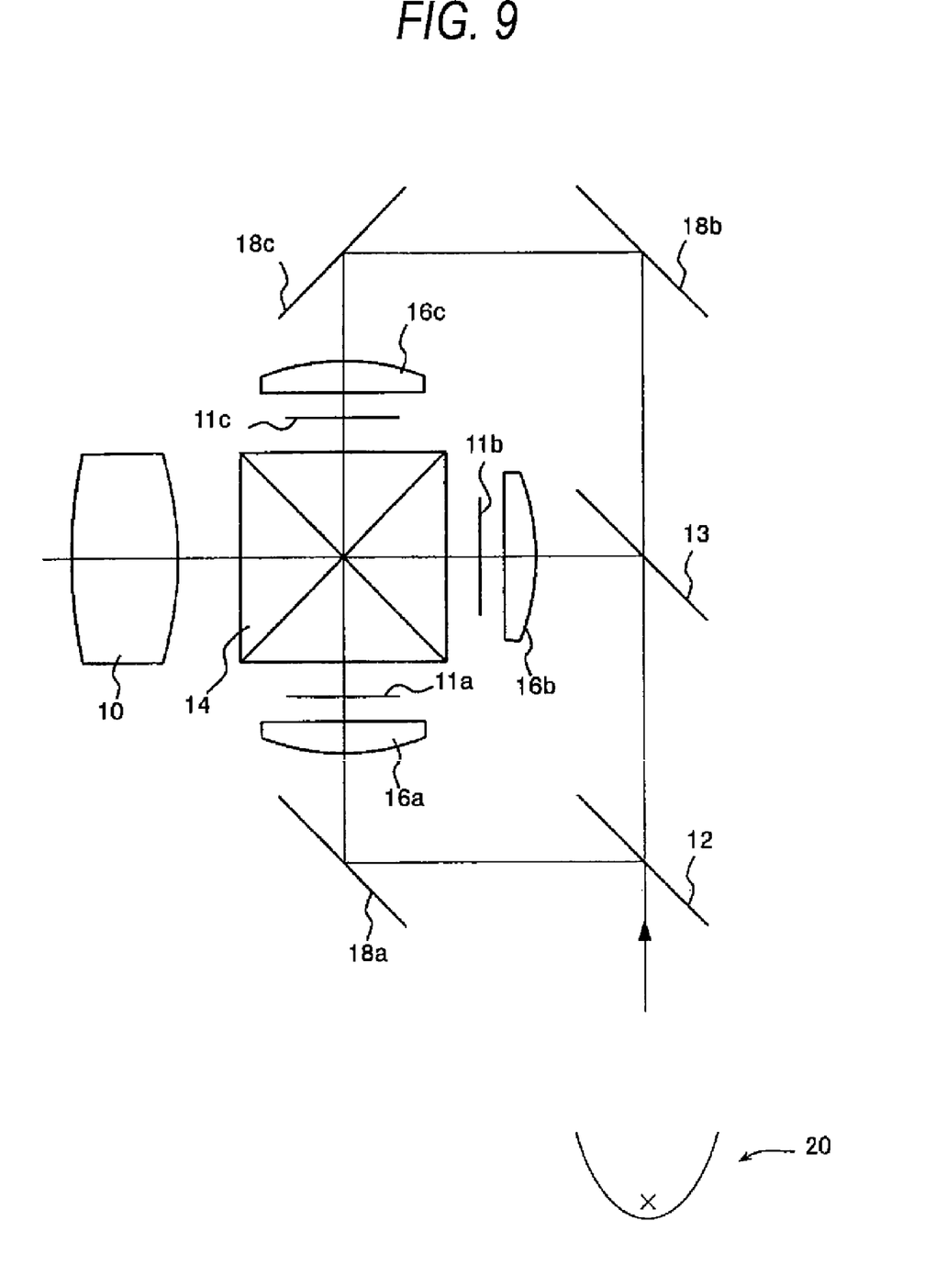
FIG. 9 is a schematic diagram showing the configuration of a projection-type display apparatus according to an embodiment of the invention.

Next, an example of the projection-type display apparatus having the aforementioned projection zoom lens device mounted thereon will be described with reference to FIG. 9. The projection-type display apparatus shown in FIG. 9 has transmission-type liquid crystal panels 11a to 11c as light valves, and employs the aforementioned projection zoom lens device according to the embodiment as a projection zoom lens device 10. Also, between a light source 20 and a dichroic mirror 12, there is disposed an integrator (not shown in the drawing) such as fly-eye. From the light source 20, white light travel through an illumination optical section to be incident on the liquid crystal panels 11a to 11c corresponding to three color rays (G light, B light, R light) and are modulated, are color-synthesized by a cross dichroic prism 14, and are projected by the projection zoom lens device 10 onto a screen not shown in the drawing. This apparatus includes dichroic mirrors 12 and 13 for color separation, a cross dichroic prism 14 for color synthesis, condenser lenses 16a to 16c, and reflection mirrors 18a to 18c. The projection-type display apparatus of this embodiment employs the projection zoom lens device according to this embodiment. Thus, it is possible to embody a projection-type display apparatus having a wide angle, good projection image quality, high brightness, and a compact size.

Also, the projection zoom lens device of the invention is not limited to applications serving as a projection zoom lens device of the projection-type display apparatus using a transmission-type liquid crystal display panel, and may be applied to a projection zoom lens device of an apparatus using a different optical modulator such as reflection-type liquid crystal display panel or DMD.

EXAMPLES

Hereinafter, the projection zoom lens device according to the invention will be further described with reference to specific examples.

Example 1

The projection zoom lens device according to Example 1 has the configuration shown in FIG. 1 as described above. That is, the projection zoom lens device is configured to have five lens groups of, in order from the magnification side, negative, positive, positive, negative, and positive refractive power, in which three groups are movable. In this case, the first lens group $G_1$ includes, in order from the magnification side, a first lens $L_1$ formed of a positive lens having a convex surface directed toward the magnification side, a second lens $L_2$ formed of a negative meniscus lens having a convex surface directed toward the magnification side, and a third lens $L_3$ formed of a biconcave lens. Also, the second lens group $G_2$ includes, in order from the magnification side, a cemented lens formed by cementing a fourth lens $L_4$ formed of a negative lens having a concave surface directed toward the reduction side and a fifth lens $L_5$ formed of a positive lens having a convex surface directed toward the magnification side, and a sixth lens $L_6$ formed of a positive lens. Also, the third lens group $G_3$ includes a seventh lens $L_7$ formed of one positive lens. Also, the fourth lens group $G_4$ includes, in order from the magnification side, an eighth lens $L_8$ formed of a negative lens, a cemented lens formed by cementing a ninth lens $L_9$ formed of a negative lens having a concave surface directed toward the reduction side and a tenth lens $L_{10}$ formed of a positive lens having a convex surface directed toward the magnification side, and an eleventh lens $L_{11}$ formed of a positive lens having a convex surface directed toward the reduction side. Also, the fifth lens group $G_5$ includes only a twelfth lens $L_{12}$ formed of a biconvex lens.

Table 1 shows R which represents a radius of curvature of each lens surface (a focal length of the lens device is normalized as 1: this also applies to the following tables), D which represents a center thickness of each lens or an airspace between the lenses (a focal length is normalized in the same manner as the radius of curvature R: this also applies to the following tables), Ne which represents a refractive index of each lens at the e-line, and ve which represents an Abbe number of each lens at the e-line, in Example 1. Also, in the Table 1 and the following Tables 2 to 4, numerals corresponding to the respective reference signs R, D, Ne, and ve sequentially increases in order from the magnification side.

Also, as described above, the projection wide-angle zoom lens according to Example 1 is configured so that the lens groups $G_2$ to $G_4$ being movable during zooming are independently moved in the optical axis X direction during zooming. In the lower portion of Table 1, shown are values of variable spaces (move 1, move 2, move 3, and move 4: those are the same in the following Tables 2 to 4) in the wide-angle end state (WIDE), the telephoto end state (TELE), and the middle region state (MEDIUM) between those.

TABLE 1

Focal Length F = 1.00~1.20~1.32

| Surface Number | R | D | Ne | ve |
|---|---|---|---|---|
| 1 | 1.6655 | 0.21342 | 1.80642 | 34.7 |
| 2 | 9.4470 | 0.04601 | | |
| 3 | 3.1949 | 0.06172 | 1.51872 | 64.0 |
| 4 | 0.7337 | 0.31992 | | |
| 5 | −1.9943 | 0.04448 | 1.59143 | 60.9 |
| 6 | 1.6140 | (Move 1) | | |
| 7 | −2.4975 | 0.04214 | 1.81264 | 25.2 |
| 8 | 1.0664 | 0.25524 | 1.72794 | 37.7 |
| 9 | −1.4846 | 0.00376 | | |
| 10 | 1.1090 | 0.13524 | 1.81078 | 40.7 |
| 11 | 8.9716 | (Move 2) | | |
| 12 | 1.6931 | 0.06791 | 1.48915 | 70.0 |
| 13 | −8.9956 | (Move 3) | | |
| 14 | 2.8153 | 0.02743 | 1.48915 | 70.0 |
| 15 | 0.8122 | 0.18567 | | |
| 16 | −0.4864 | 0.03705 | 1.76167 | 27.3 |
| 17 | 1.7586 | 0.22132 | 1.48915 | 70.0 |
| 18 | −0.7059 | 0.02796 | | |
| 19 | 6.9657 | 0.21871 | 1.62287 | 60.0 |
| 20 | −1.0135 | (Move 4) | | |
| 21 | 1.8403 | 0.14846 | 1.80634 | 30.1 |
| 22 | −10.7211 | 0.34936 | | |
| 23 | ∞ | 0.91801 | 1.51825 | 63.9 |
| 24 | ∞ | | | |

TABLE 1-continued

Focal Length F = 1.00~1.20~1.32

| Moving Space | Wide | Middle | Tele |
|---|---|---|---|
| Move 1 | 0.59068 | 0.36137 | 0.26026 |
| Move 2 | 0.65322 | 0.53799 | 0.46787 |
| Move 3 | 0.19276 | 0.33274 | 0.41882 |
| Move 4 | 0.00578 | 0.21033 | 0.29548 |

Also, Table 5 shows numerical values corresponding to the conditional expressions in Example 1.

Figure 5:
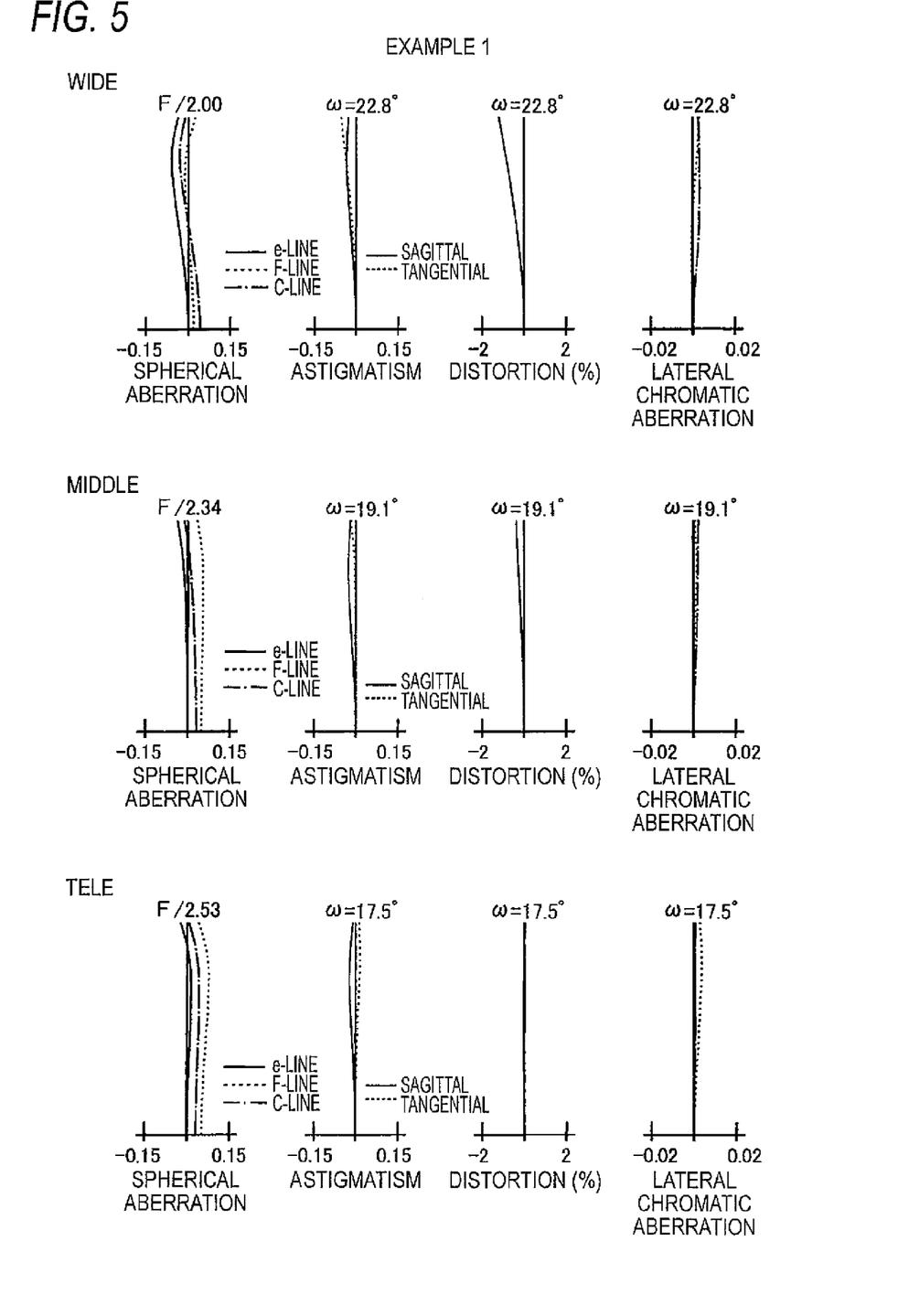
FIG. 5 is an aberration diagram showing various aberrations (spherical aberration, astigmatism, distortion, and lateral chromatic aberration) of the projection zoom lens device according to Example 1.

FIG. 5 is an aberration diagram illustrating various aberrations (spherical aberration, astigmatism, distortion, and lateral chromatic aberration) of the projection zoom lens device according to Example 1. Also, in FIGS. 5 to 8, the spherical aberration diagrams show aberration curves at the e-line, F-line, and C-line light, the astigmatism diagrams show aberration curves with respect to a sagittal image plane and a tangential image plane, and the lateral chromatic aberration diagrams show aberration curves of F-line and C-line with respect to light at the e-line light.

As can be seen from FIG. 5, according to the projection zoom lens device of Example 1, the aberrations are satisfactorily corrected.

Also, as shown in Table 5, the projection zoom lens device of Example 1 satisfies the conditional expressions (1), (1'), (2), (3), and (4).

Example 2

Figure 2:
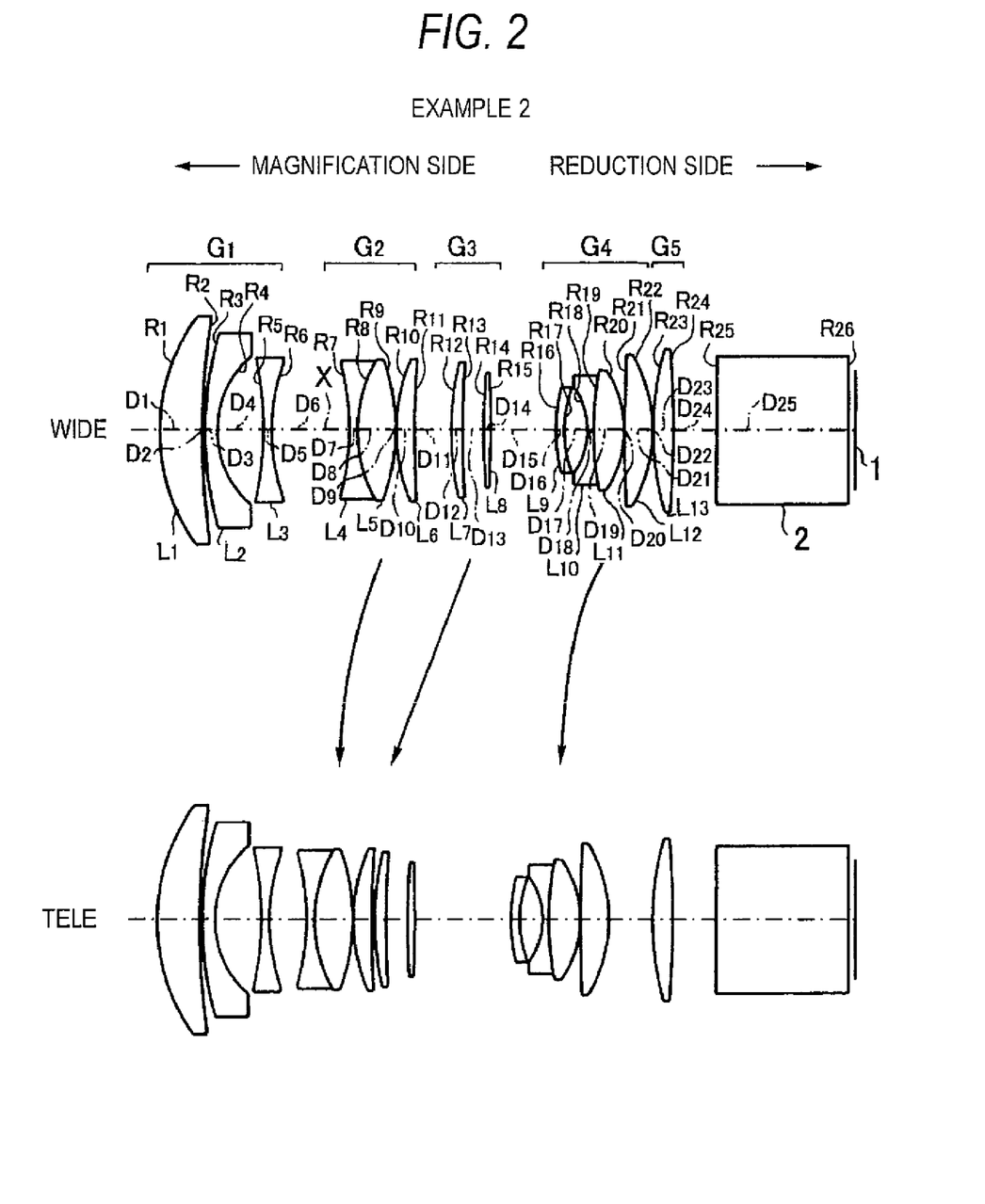
FIG. 2 is a schematic diagram showing the configuration of a projection zoom lens device according to Example 2 of the invention.

FIG. 2 shows a schematic configuration of the projection zoom lens device according to Example 2. The projection zoom lens device of Example 2 has substantially the same configuration as that of Example 1 and is configured to have five lens groups of, in order from the magnification side, negative, positive, positive, negative, and positive refractive power, in which three groups are movable. Example 2 is different from Example 1 in that the third lens group $G_3$ is formed of two positive lenses of a seventh lens $L_7$ and an eighth lens $L_8$.

Also, Example 2 is different from Example 1 in the number of lenses. Thus, predetermined lens numbers are sequentially renumbered in accordance with this difference.

Table 2 shows R which represents a radius of curvature of each lens surface, D which represents a center thickness of each lens or an airspace between the lenses, Ne which represents a refractive index of each lens at the c-line, and ve which represents an Abbe number of each lens at the e-line, in Example 2.

TABLE 2

Focal Length F = 1.00~1.20~1.32

| Surface Number | R | D | Ne | ve |
|---|---|---|---|---|
| 1 | 1.3321 | 0.29633 | 1.80642 | 34.7 |
| 2 | 5.3184 | 0.01936 | | |
| 3 | 2.4473 | 0.08712 | 1.59143 | 60.9 |
| 4 | 0.6838 | 0.31997 | | |
| 5 | −2.1461 | 0.05421 | 1.59143 | 60.9 |
| 6 | 1.3686 | (Move 1) | | |
| 7 | −1.6477 | 0.05615 | 1.81264 | 25.2 |
| 8 | 0.9680 | 0.26608 | 1.72794 | 37.7 |
| 9 | −1.3966 | 0.00387 | | |

TABLE 2-continued

Focal Length F = 1.00~1.20~1.32

| | | | | |
|---|---|---|---|---|
| 10 | 1.2151 | 0.12958 | 1.80642 | 34.7 |
| 11 | 8.5668 | (Move 2) | | |
| 12 | 2.0171 | 0.08015 | 1.48915 | 70.0 |
| 13 | 6.6734 | 0.14886 | | |
| 14 | 5.1200 | 0.05212 | 1.59143 | 60.9 |
| 15 | −8.4492 | (Move 3) | | |
| 16 | 1.2520 | 0.05807 | 1.48915 | 70.0 |
| 17 | 0.8063 | 0.15936 | | |
| 18 | −0.5114 | 0.04162 | 1.81264 | 25.2 |
| 19 | 2.1535 | 0.21358 | 1.48915 | 70.0 |
| 20 | −0.7456 | 0.00386 | | |
| 21 | 13.7806 | 0.19441 | 1.71615 | 53.6 |
| 22 | −1.0394 | (Move 4) | | |
| 23 | 1.9821 | 0.14209 | 1.81264 | 25.2 |
| 24 | −7.2359 | 0.34828 | | |
| 25 | ∞ | 0.91574 | 1.51825 | 63.9 |
| 26 | ∞ | | | |

| Moving Space | Wide | Middle | Tele |
|---|---|---|---|
| Move 1 | 0.54313 | 0.34318 | 0.25735 |
| Move 2 | 0.25755 | 0.11368 | 0.01927 |
| Move 3 | 0.45058 | 0.58967 | 0.67514 |
| Move 4 | 0.00576 | 0.21048 | 0.30526 |

Also, Table 5 shows numerical values corresponding to the conditional expressions in Example 2.

Figure 6:
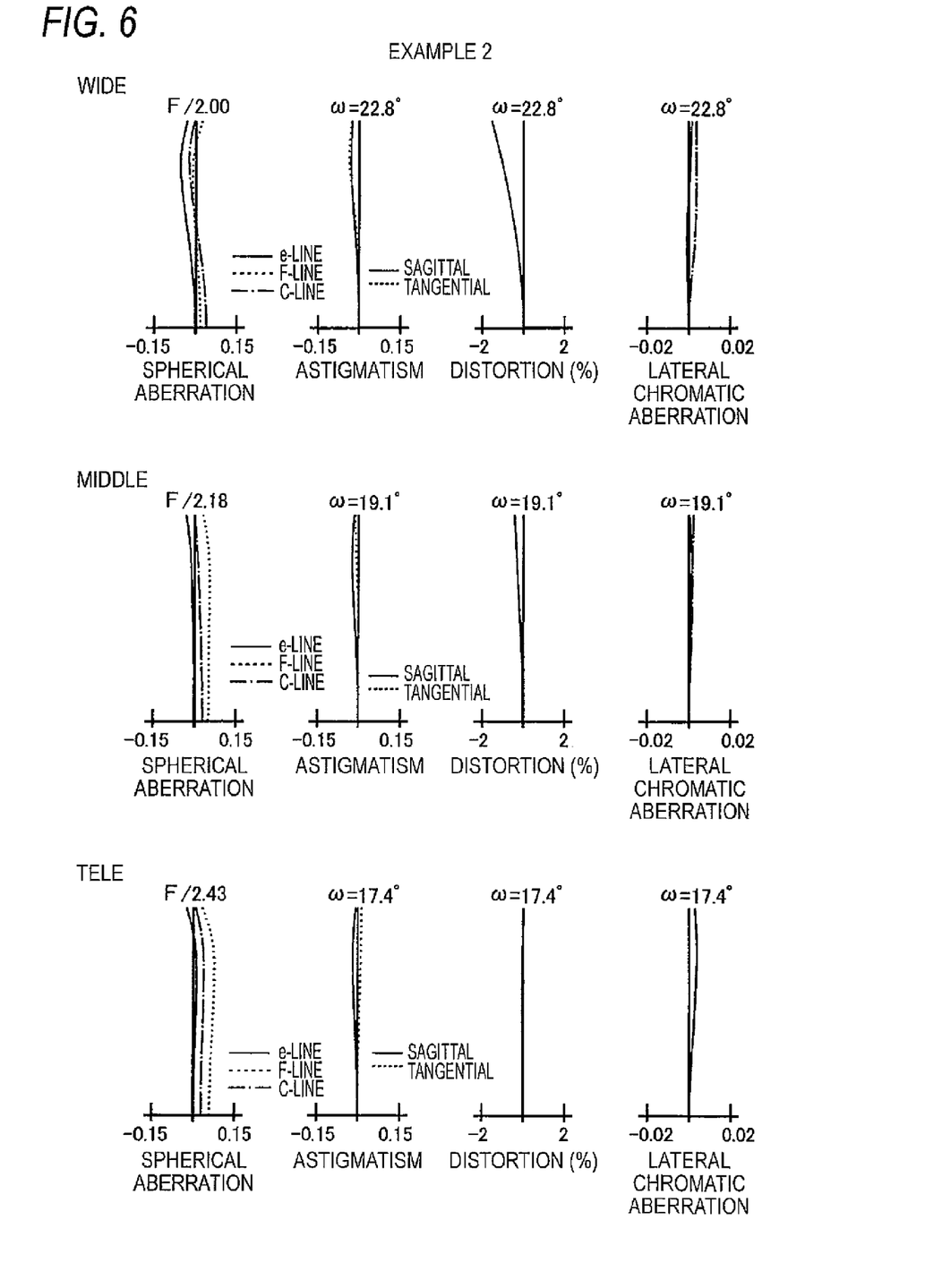
FIG. 6 is an aberration diagram showing various aberrations (spherical aberration, astigmatism, distortion, and lateral chromatic aberration) of the projection zoom lens device according to Example 2.

FIG. 6 is an aberration diagram illustrating various aberrations (spherical aberration, astigmatism, distortion, and lateral chromatic aberration) of the projection zoom lens device according to Example 2.

As can be seen from FIG. 6, according to the projection zoom lens device of Example 2, the aberrations are satisfactorily corrected.

Also, as shown in Table 5, the projection zoom lens device of Example 2 satisfies the conditional expressions (1), (1'), (2), (3), and (4).

Example 3

Figure 3:
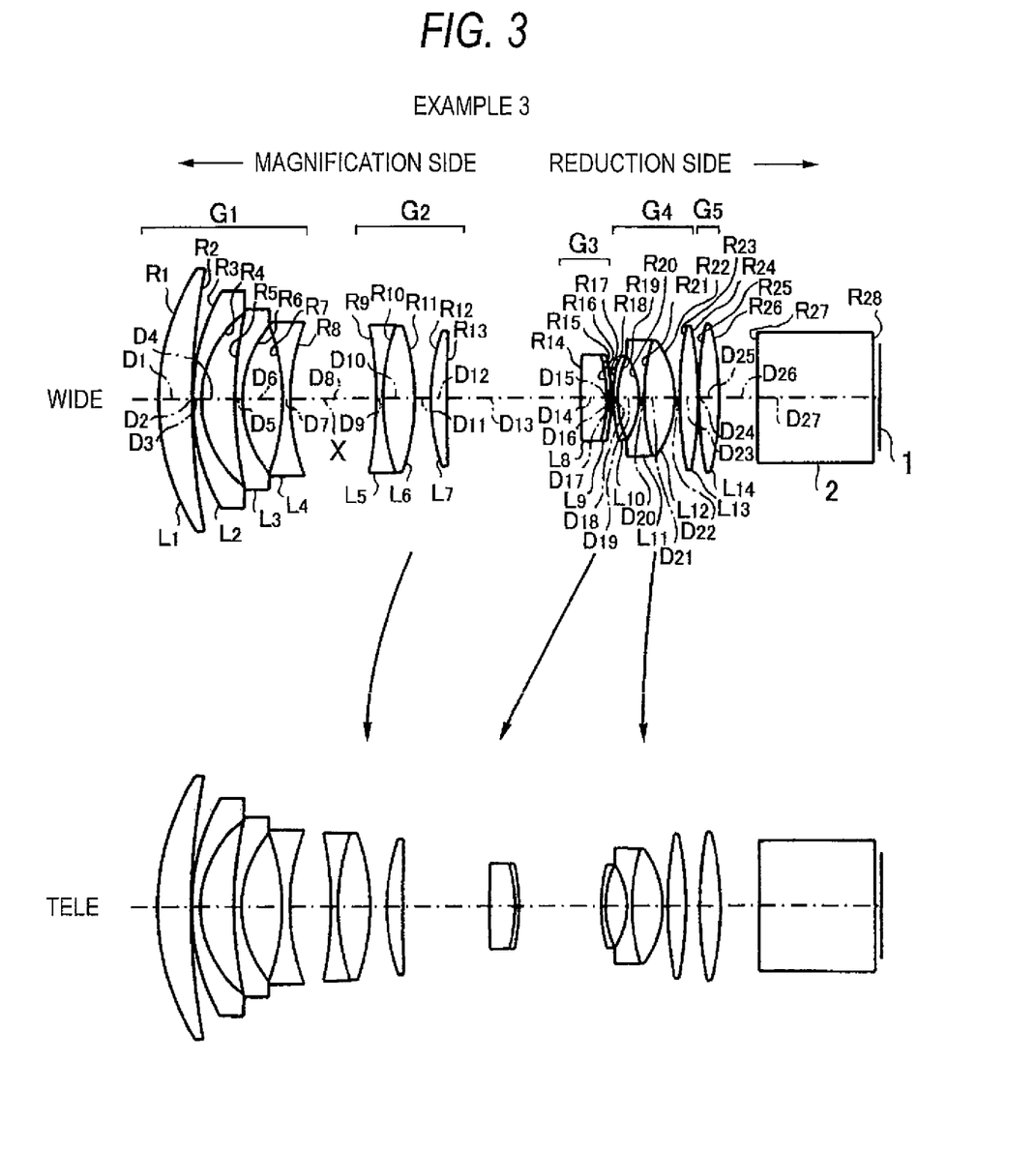
FIG. 3 is a schematic diagram showing the configuration of a projection zoom lens device according to Example 3 of the invention.

FIG. 3 shows a schematic configuration of the projection zoom lens device according to Example 3. Similarly to Example 1, the projection zoom lens device according to Example 3 is configured to have five lens groups, in which three groups are movable. However, the configuration of the projection zoom lens device according to Example 3 is different from that of Example 1 in the following points: That is, the lens device includes lens groups of negative, positive, positive, positive, and positive refractive power in order from the magnification side. Also, the first lens group $G_1$ includes, in order from the magnification side, a first lens $L_1$ formed of a positive lens having a convex surface directed to toward the magnification side, a second lens $L_2$ and a third lens $L_3$ formed of negative meniscus lenses having a convex surface directed toward the magnification side, and a fourth lens $L_4$ formed of a biconcave lens. Also, the third lens group $G_3$ includes, in order from the magnification side, adjacent two lenses of an eighth lens $L_8$ formed of a positive lens having a convex surface directed toward the reduction side and a ninth lens $L_9$ formed of a negative lens having a concave surface directed toward the magnification side.

Also, Example 3 is different from Example 1 in the number of lenses. Thus predetermined lens numbers are sequentially renumbered in accordance with this difference.

Table 3 shows R which represents a radius of curvature of each lens surface, D which represents a center thickness of each lens or an airspace between the lenses, Ne which represents a refractive index of each lens at the e-line, and ve which represents an Abbe number of each lens at the e-line, in Example 3.

TABLE 3

Focal Length F = 1.00~1.22~1.37

| Surface Number | R | D | Ne | ve |
|---|---|---|---|---|
| 1 | 2.5051 | 0.34662 | 1.77621 | 49.4 |
| 2 | 7.0074 | 0.00505 | | |
| 3 | 2.2603 | 0.09095 | 1.48915 | 70.0 |
| 4 | 1.1202 | 0.34180 | | |
| 5 | 4.1587 | 0.07327 | 1.48915 | 70.0 |
| 6 | 1.1694 | 0.40987 | | |
| 7 | −2.1776 | 0.07579 | 1.48915 | 70.0 |
| 8 | 2.1776 | (Move 1) | | |
| 9 | −3.8907 | 0.07074 | 1.79173 | 26.1 |
| 10 | 2.2032 | 0.32969 | 1.80811 | 46.3 |
| 11 | −2.2032 | 0.17003 | | |
| 12 | 2.0884 | 0.16750 | 1.81184 | 33.0 |
| 13 | 30.8041 | (Move 2) | | |
| 14 | 13.9745 | 0.26325 | 1.51825 | 63.9 |
| 15 | −1.5714 | 0.00341 | | |
| 16 | −1.4812 | 0.04042 | 1.81264 | 25.2 |
| 17 | −2.0803 | (Move 3) | | |
| 18 | 1.6201 | 0.04548 | 1.48915 | 70.0 |
| 19 | 1.0396 | 0.21964 | | |
| 20 | −0.7644 | 0.04926 | 1.65222 | 33.5 |
| 21 | 1.9706 | 0.31479 | 1.49846 | 81.2 |
| 22 | −1.0000 | 0.05129 | | |
| 23 | 3.8879 | 0.18518 | 1.74795 | 44.5 |
| 24 | −3.8879 | (Move 4) | | |
| 25 | 4.0096 | 0.21575 | 1.65425 | 58.3 |
| 26 | −3.0177 | 0.45736 | | |
| 27 | ∞ | 1.19498 | 1.51825 | 63.9 |
| 28 | ∞ | | | |

| Moving Space | Wide | Middle | Tele |
|---|---|---|---|
| Move 1 | 0.88194 | 0.57099 | 0.42236 |
| Move 2 | 1.39141 | 1.10089 | 0.89813 |
| Move 3 | 0.02476 | 0.49819 | 0.84488 |
| Move 4 | 0.00758 | 0.13560 | 0.14037 |

Also, Table 5 shows numerical values corresponding to the conditional expressions in Example 3.

Figure 7:
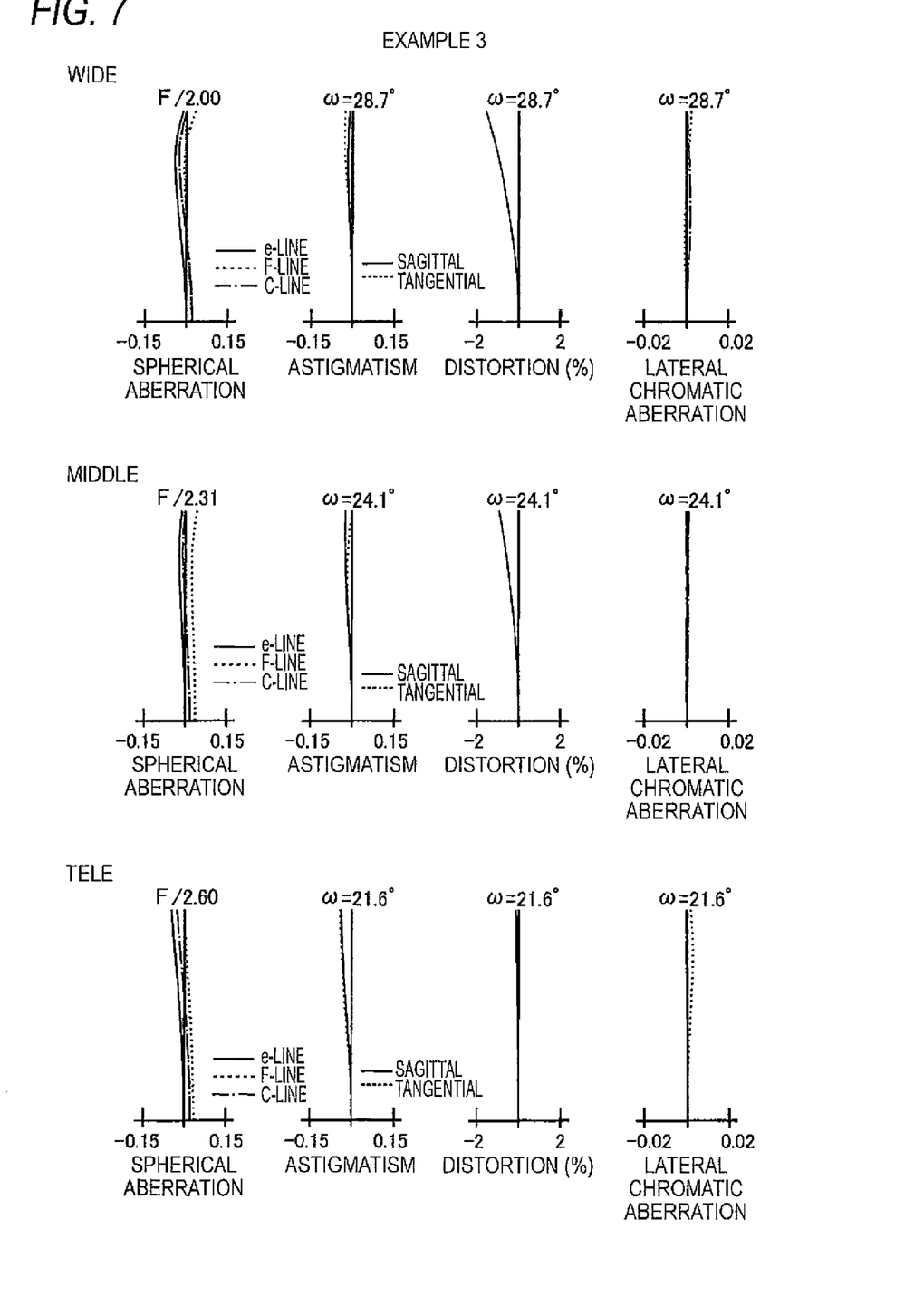
FIG. 7 is an aberration diagram showing various aberrations (spherical aberration, astigmatism, distortion, and lateral chromatic aberration) of the projection zoom lens device according to Example 3.

FIG. 7 is an aberration diagram illustrating various aberrations (spherical aberration, astigmatism, distortion, and lateral chromatic aberration) of the projection zoom lens device according to Example 3.

As can be seen from FIG. 7, according to the projection zoom lens device of Example 3, the aberrations are satisfactorily corrected.

Also, as shown in Table 5, the projection zoom lens device of Example 3 satisfies the conditional expressions (1), (1'), (2), (3), and (4).

Example 4

Figure 4:
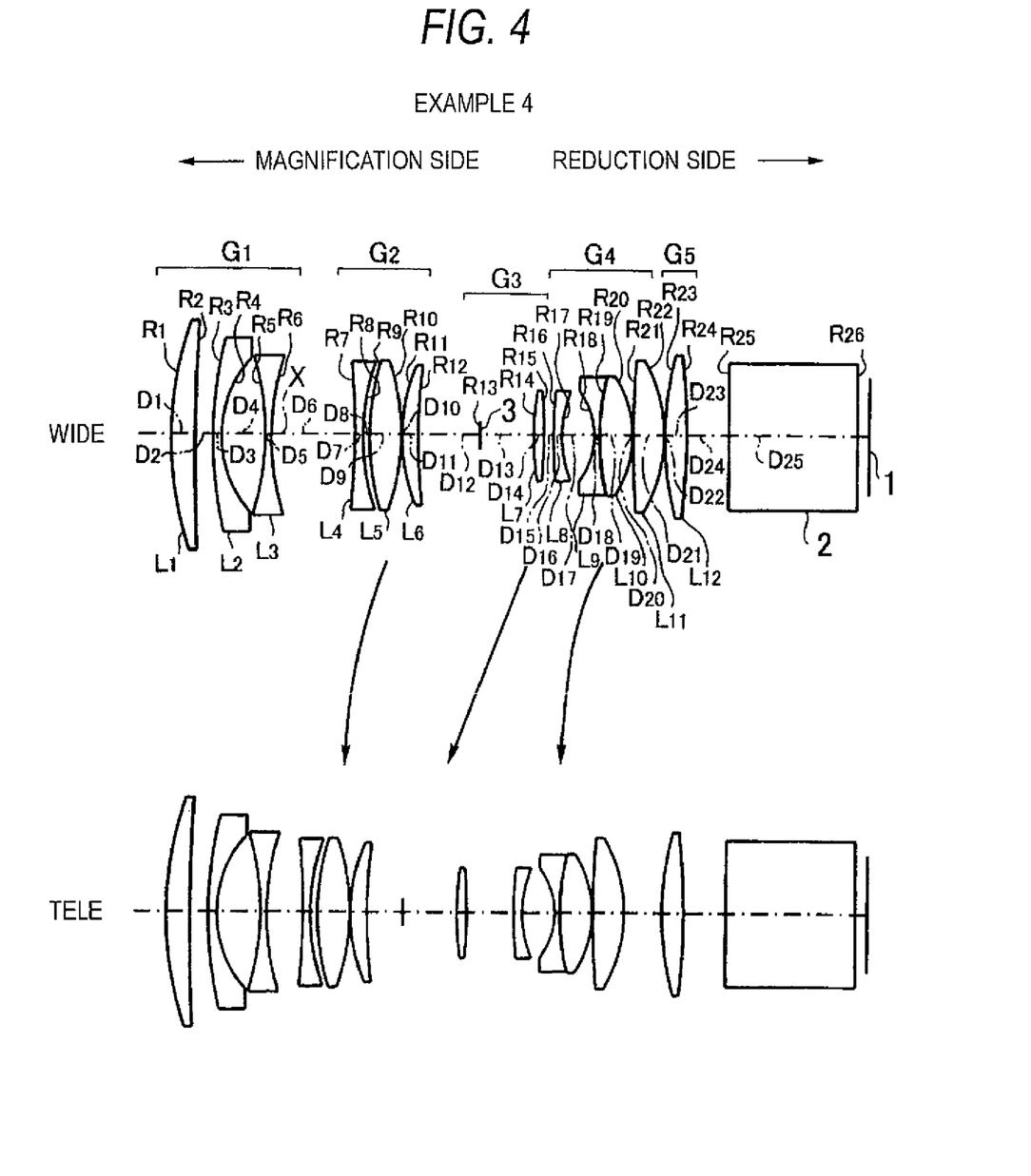
FIG. 4 is a schematic diagram showing the configuration of a projection zoom lens device according to Example 4 of the invention.

FIG. 4 shows a schematic configuration of the projection zoom lens device according to Example 4. The projection zoom lens device of Example 4 has substantially the same configuration as that of Example 1, and is configured to have five lens groups of, in order from the magnification side, negative, positive, positive, negative, and positive refractive power, in which three groups are movable. However, the configuration of the projection zoom lens device according to Example 4 is different from that of Example 1 in the following points: That is, the fourth lens $L_4$ formed of the negative lens having a concave surface directed toward the reduction side and the fifth lens $L_5$ formed of the positive lens having a convex surface directed toward the magnification side that mainly constitute the second lens group $G_2$ don't form a cemented lens, but are separated from each other. Also, an aperture diaphragm 3 is disposed in the third lens group $G_3$ to be closest to the magnification side.

Table 4 shows R which represents a radius of curvature of each lens surface, D which represents a center thickness of each lens or an airspace between the lenses, Ne which represents a refractive index of each lens at the e-line, and ve which represents an Abbe number of each lens at the e-line, in Example 4.

TABLE 4

Focal Length F = 1.00~1.20~1.32

| Surface Number | R | D | Ne | ve |
|---|---|---|---|---|
| 1 | 2.47779 | 0.17159 | 1.80642 | 34.7 |
| 2 | 15.68766 | 0.13134 | | |
| 3 | 2.90760 | 0.06204 | 1.51872 | 64.0 |
| 4 | 0.83095 | 0.30886 | | |
| 5 | −1.86676 | 0.04460 | 1.59143 | 60.9 |
| 6 | 1.91696 | (Move 1) | | |
| 7 | −4.97631 | 0.05430 | 1.70442 | 29.9 |
| 8 | 1.60674 | 0.04847 | | |
| 9 | 1.82108 | 0.22909 | 1.73234 | 54.5 |
| 10 | −1.59524 | 0.00388 | | |
| 11 | 1.24073 | 0.11700 | 1.80811 | 46.3 |
| 12 | 3.85365 | (Move 2) | | |
| 13 | (Aperture Diaphragm) | 0.38493 | | |
| 14 | 2.13682 | 0.07151 | 1.48915 | 70.0 |
| 15 | −3.93736 | (Move 3) | | |
| 16 | 3.51202 | 0.05818 | 1.48915 | 70.0 |
| 17 | 0.81923 | 0.24018 | | |
| 18 | −0.52154 | 0.04166 | 1.76167 | 27.3 |
| 19 | 1.91104 | 0.22892 | 1.49846 | 81.2 |
| 20 | −0.76424 | 0.00390 | | |
| 21 | 6.57558 | 0.21874 | 1.62287 | 60.0 |
| 22 | −1.07109 | (Move 4) | | |
| 23 | 2.17006 | 0.15570 | 1.80634 | 29.6 |
| 24 | −5.59157 | 0.38825 | | |
| 25 | ∞ | 0.91734 | 1.51825 | 63.9 |
| 26 | ∞ | | | |

| Moving Space | Wide | Middle | Tele |
|---|---|---|---|
| Move 1 | 0.59719 | 0.35991 | 0.25599 |
| Move 2 | 0.44406 | 0.32308 | 0.25843 |
| Move 3 | 0.06929 | 0.23438 | 0.33279 |
| Move 4 | 0.00578 | 0.19894 | 0.26912 |

Also, Table 5 shows numerical values corresponding to the conditional expressions in Example 4.

Figure 8:
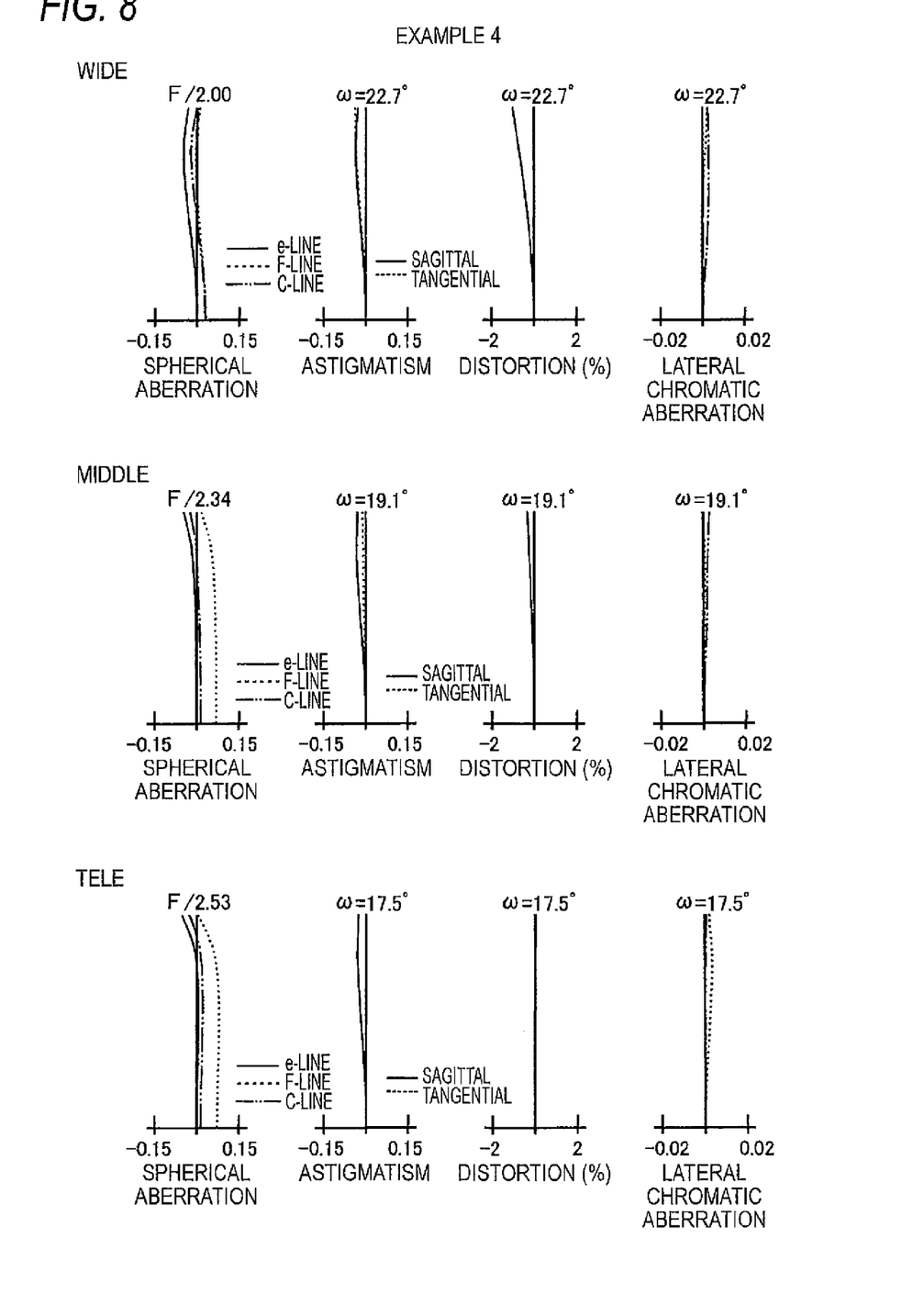
FIG. 8 is an aberration diagram showing various aberrations (spherical aberration, astigmatism, distortion, and lateral chromatic aberration) of the projection zoom lens device according to Example 4.

FIG. 8 is an aberration diagram illustrating various aberrations (spherical aberration, astigmatism, distortion, and lateral chromatic aberration) of the projection zoom lens device according to Example 4.

As can be seen from FIG. 8, according to the projection zoom lens device of Example 4, the aberrations are satisfactorily corrected.

In addition, as shown in Table 5, the projection zoom lens device of Example 4 satisfies the conditional expressions (1), (1'), (2), (3), and (4).

TABLE 5

| Conditional Expression | Example 1 | Example 2 | Example 3 | Example 4 |
|---|---|---|---|---|
| (1), (1') | 1.07 | 0.96 | 1.26 | 0.64 |
| (2) | 1.96 | 1.93 | 2.66 | 1.96 |
| (3) | 0.94 | 0.94 | 1.23 | 0.98 |
| (4) | 7.97 | 47.24 | 29.33 | 6.60 |

What is claimed is:

1. A projection zoom lens device comprising, in order from a magnification side:

a first lens group that has a negative refractive power and is fixed during zooming;

a second lens group that has a positive refractive power;

a third lens group that has a positive refractive power;

a fourth lens group that has a positive refractive power or a negative refractive power, wherein the second to fourth lens groups are moved, independently from each other, along an optical axis during zooming; and a fifth lens group that has a positive refractive power and is fixed during zooming, wherein a lens, being closest to the magnification side, of the second lens group is formed of a negative lens, and the fifth lens group is formed of a single positive lens.

2. The projection zoom lens device according to claim 1, wherein the following conditional expressions (1) to (3) are satisfied:

$$0.3 < |f1a/fw| < 1.6 \quad (1)$$

$$1.5 < f5/fw < 3.0 \quad (2)$$

$$0.8 < Bf/fw \quad (3)$$

where f1a denotes a synthetic focal length of the first lens group and the lens of the second lens group being closest to the magnification side, in a wide-angle end state, fw denotes a focal length of the projection zoom lens device in the wide-angle end state, f5 denotes a focal length of the fifth lens group, and Bf denotes an air-equivalent value of a back focal length with a conjugate point of the magnification side being at infinity.

3. The projection zoom lens device according to claim 1, wherein the second lens group, the third lens group, and the fourth lens group are moved in the same direction during zooming.

4. The projection zoom lens device according to claim 1, wherein the fourth lens group satisfies the following conditional expression (4):

$$3.0 < |f4/fw| \quad (4)$$

where f4 denotes a focal length of the fourth lens group.

5. The projection zoom lens device according to claim 1, wherein the negative lens is disposed to be closest to the magnification side of the second lens group, and is cemented to a positive lens located on a reduction side of the negative lens.

6. A projection-type display apparatus comprising:

a light source;

a light valve;

an illumination optical section that guides a light flux emitted from the light source, to the light valve; and the projection zoom lens device according to claim 1, wherein the light flux emitted from the light source is optically modulated by the light valve, and is projected onto a screen by the projection zoom lens device.

* * * * *